(12) United States Patent
Fukudome et al.

(10) Patent No.: US 11,085,431 B2
(45) Date of Patent: Aug. 10, 2021

(54) DISPLACEMENT CONTROL VALVE (71) Applicant: EAGLE INDUSTRY CO., LTD., Tokyo (JP)

(72) Inventors: Kohei Fukudome, Tokyo (JP); Daichi Kurihara, Tokyo (JP); Keigo Shirafuji, Tokyo (JP); Hideki Higashidozono, Tokyo (JP)

(73) Assignee: EAGLE INDUSTRY CO., LTD.

( * ) Notice: Subject to any disclaimer, the term of this patent is extended or adjusted under 35 U.S.C. 154(b) by 165 days.

(21) Appl. No.: 16/471,215

(22) PCT Filed: Dec. 27, 2017

(86) PCT No.: PCT/JP2017/046838
§ 371 (c)(1),
(2) Date: Jun. 19, 2019

(87) PCT Pub. No.: WO2018/124156
PCT Pub. Date: Jul. 5, 2018

(65) Prior Publication Data
US 2020/0088178 A1    Mar. 19, 2020

(30) Foreign Application Priority Data
Dec. 28, 2016    (JP) .............................. JP2016-255383

(51) Int. Cl.
*F04B 27/18* (2006.01)
*F16K 31/06* (2006.01)

(52) U.S. Cl.
CPC .......... *F04B 27/1804* (2013.01); *F16K 31/06* (2013.01); *F04B 2027/185* (2013.01);
(Continued)

(58) Field of Classification Search
CPC ................. F04B 27/18; F04B 27/1804; F04B 2027/1813; F04B 2027/1822;
(Continued)

(56) References Cited

U.S. PATENT DOCUMENTS 6,481,976 B2* 11/2002 Kimura ............... F04B 27/1804
137/454.6
8,079,827 B2  12/2011 Iwa et al. .................... 417/222.2
(Continued)

FOREIGN PATENT DOCUMENTS

JP    2001-165055    6/2001    .............. F04B 49/00
JP    2002267039    9/2002    .............. F04B 27/14
(Continued)

OTHER PUBLICATIONS

European Extended Search Report issued in application No. 17889148.7, dated May 15, 2020 (7 pgs).
(Continued)

*Primary Examiner* — Patrick Hamo
*Assistant Examiner* — Joseph S. Herrmann
(74) *Attorney, Agent, or Firm* — Hayes Soloway P.C.

(57) ABSTRACT

Provided is a displacement control valve capable of quickly reducing pressure in a control chamber to a level of pressure kept during continuous driving, at the time of the startup of a variable displacement compressor. The valve housing is provided with a through hole constituting a part of a first communicating passage that communicates with a pressure chamber at one end thereof and that is communicable with a second valve chest at the other end thereof.

4 Claims, 6 Drawing Sheets

(52) U.S. Cl.
CPC ............... *F04B 2027/1813* (2013.01); *F04B 2027/1827* (2013.01); *F04B 2027/1831* (2013.01); *F04B 2027/1845* (2013.01); *F04B 2027/1854* (2013.01); *F04B 2027/1859* (2013.01)

(58) Field of Classification Search
CPC ...... F04B 2027/1827; F04B 2027/1831; F04B 2027/1845; F04B 2027/185; F04B 2027/1854; F04B 2027/1859; F16K 11/044; F16K 31/06
See application file for complete search history.

(56) References Cited

U.S. PATENT DOCUMENTS

| | | | | |
|---|---|---|---|---|
| 9,777,863 | B2* | 10/2017 | Higashidozono | ... F04B 27/1804 |
| 2001/0003573 | A1 | 6/2001 | Kimura et al. | ........... F04B 1/26 |
| 2005/0163624 | A1 | 7/2005 | Taguchi | ..................... 417/222.2 |
| 2008/0138213 | A1* | 6/2008 | Umemura | ........... F04B 27/1804 417/222.2 |
| 2009/0183786 | A1 | 7/2009 | Iwa et al. | ................... 137/487.5 |
| 2015/0345655 | A1* | 12/2015 | Higashidozono | ... F04B 27/1804 137/624.27 |

FOREIGN PATENT DOCUMENTS

| | | | |
|---|---|---|---|
| JP | 2003301772 | 10/2003 | ............. F04B 27/14 |
| JP | 2006-22768 | 1/2006 | ............. F04B 27/14 |
| JP | 2009079533 | 4/2009 | ............. F04B 27/14 |
| JP | 5167212 | 3/2013 | ............. F04B 27/14 |
| WO | WO2007119380 | 10/2007 | ............. F04B 27/14 |

OTHER PUBLICATIONS

International Search Report (w/translation) and Written Opinion (w/machine translation) issued in application No. PCT/JP2017/046838, dated Mar. 20, 2018 (12 pgs).
Korean Official Action issued in application No. 2020-036438855, dated May 27, 2020 (9 pgs).
International Preliminary Report on Patentability issued in Application No. PCT/JP2017/046838, dated Jul. 2, 2019 (8 pgs).
Chinese Office Action (w/translation) issued in application No. 201750078652.9, dated Feb. 3, 2020 (12 pgs).
Japanese Official Action issued in application No. 2018-559562, dated Mar. 23, 2021 (7 pgs).

* cited by examiner

DISPLACEMENT CONTROL VALVE

TECHNICAL FIELD

The present invention relates to a displacement control valve for variably controlling the displacement or pressure of working fluid, and more particularly, relates to a displacement control valve for controlling the discharge rate of a variable displacement compressor or the like suitable for an air-conditioning system of an automobile or the like, according to the pressure.

BACKGROUND ART

A variable displacement compressor suitable for an air-conditioning system of an automobile or the like includes a rotating shaft rotationally driven by the torque of an engine, a swash plate connected to the rotating shaft at a variable inclination angle, and compression pistons connected to the awash plate. By changing the inclination angle of the awash plate, the piston stroke is changed to control the fluid discharge rate. Using a displacement control valve that is driven to open and close by electromagnetic force, the inclination angle of the swash plate can be changed continuously by properly controlling pressure in a control chamber while utilizing suction pressure Ps in a suction chamber for sucking fluid, discharge pressure Pd in a discharge chamber for discharging fluid pressurized by the pistons, and control pressure Pc in the control chamber housing the swash plate.

In this variable displacement compressor, when the variable displacement compressor is stopped and then left in a stopped state for a long time, the suction pressure Ps, the discharge pressure Pd, and the control pressure Pc of the variable displacement compressor become equal pressure, and the control pressure Pc and the suction pressure Ps become much higher than the control pressure Pc and the suction pressure Ps during the continuous driving of the variable displacement compressor (hereinafter, sometimes simply referred to as "during continuous driving"). At the control pressure Pc much higher than that during continuous driving, the discharge rate cannot be controlled properly. Thus, it is necessary to discharge fluid in the control chamber to reduce the control pressure Pc. For this reason, there is a displacement control valve that can discharge fluid from a control chamber of a variable displacement compressor in a short time at the time of the startup of the variable displacement compressor.

Figure 6:
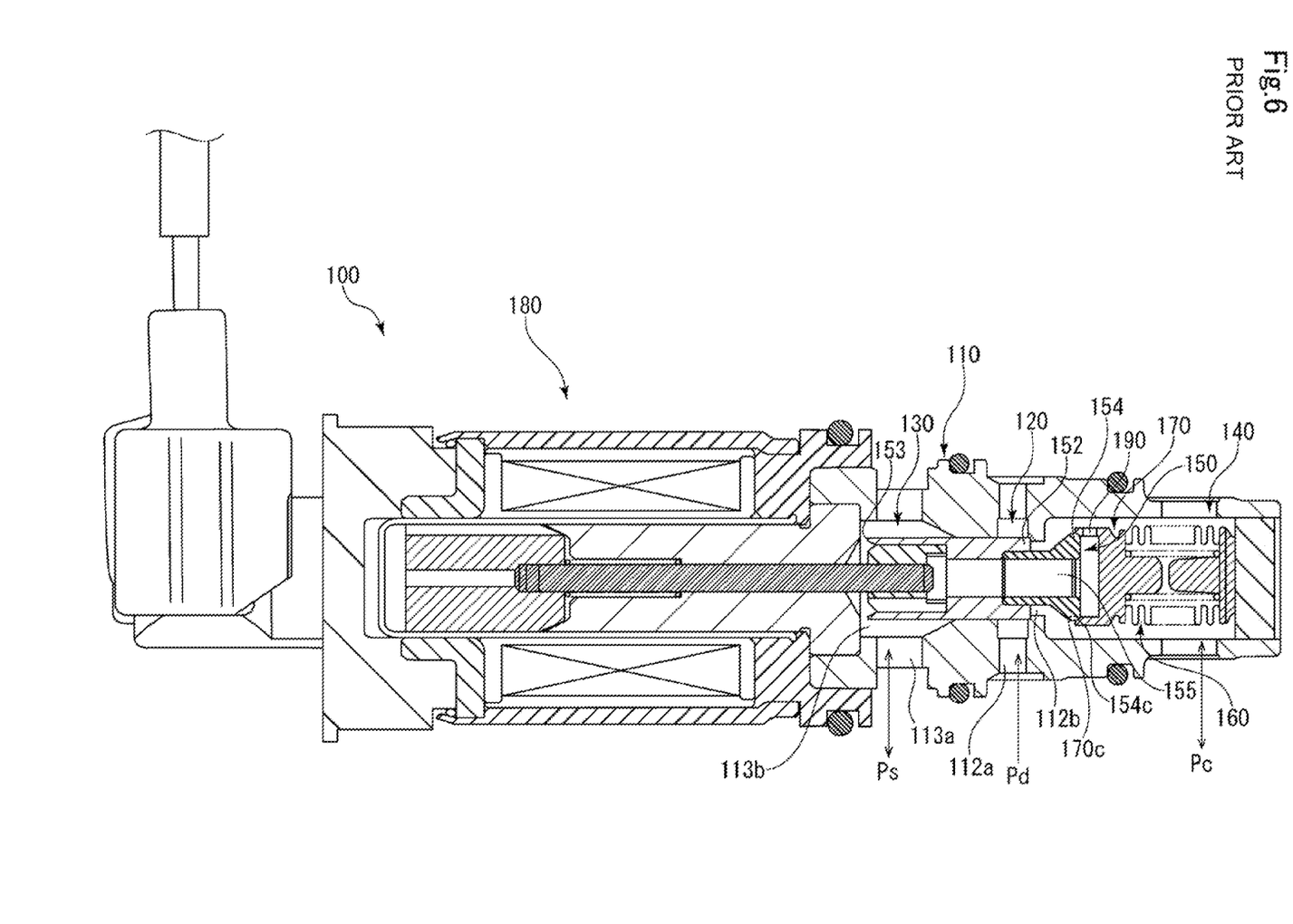
FIG. 6 is a cross-sectional view showing the entirety of a conventional displacement control valve disclosed in the Patent Citation 1, in which a coil is energized and a second valve section is opened.

There is known a displacement control valve 100 disclosed in Patent Citation 1 that includes, as shown in FIG. 6, a valve housing 110 that includes a first valve chest 120 formed midway between discharge-side passages 112a and 112b that connect a discharge chamber and a control chamber, a second valve chest 130 formed midway between suction-side passages 113a and 113b that connect a suction chamber and the control chamber, and a third valve chest 140 (pressure chamber) formed across the first valve chest 120 from the second valve chest 130, a valve body 150 that has a first valve section 152 for opening and closing the discharge-side passages 112a and 112b in the first valve chest 120 and a second valve section 153 for opening and closing the suction-side passages 113a and 113b in the second valve chest 130, the first valve section 152 and the second valve section 153 integrally formed and performing opening and closing operations in opposite directions by its reciprocation, an intermediate communicating passage 155 (second communicating passage) formed in the valve body 150 for connecting the second valve chest 130 and the third valve chest 140, a pressure-sensitive element 160 that is disposed in the third valve chest 140, and exerts an urging force in such a direction as to open the first valve section 152 by its extension and contracts with an increase in ambient pressure, an adapter 170 that is provided at a free end of the pressure-sensitive element 160 in the extension and contraction direction, and has an annular seat surface, a third valve section 154 that moves with the valve body 150 in the third valve chest 140 in an integrated manner, and has an engaging surface that can open and close the suction-side passages 113a and 113b by being seated on and disengaged from the adapter 170, a solenoid 180 for exerting electromagnetic drive force on the valve body 150, and an auxiliary communicating passage 190 formed in the adapter 170 to connect the interior of the third valve chest 140 and the intermediate communicating passage 155.

At the time of the startup of the variable displacement compressor, when the solenoid 180 of the displacement control valve 100 is energized and the valve body 150 moves, the first valve section 152 moves in a closing direction while the second valve section 153 moves in an opening direction, so that the auxiliary communicating passage 190 and the intermediate communicating passage 155 allow communication from the third valve chest 140 to the second valve chest 130, and thus the suction-side passages 113a and 113b are opened. This allows fluid under high pressure in the control chamber of the variable displacement compressor to be discharged through the auxiliary communicating passage 190 and the intermediate communicating passage 155 into the suction chamber. If the pressure-sensitive element 160 is contracted under the control pressure Pc, and the third valve section 154 is disengaged from the adapter 170 and opened, a flow path into the intermediate communicating passage 155 is enlarged, so that fluid can be discharged from the interior of the control chamber into the suction chamber to reduce the control pressure Pc more quickly. Thereafter, when the control pressure Pc is reduced to pressure during continuous driving, the pressure-sensitive element 160 elastically returns and extends, and the adapter 170 is seated on the third valve section 154 to close the valve.

CITATION LIST

Patent Literature

Patent Citation 1: JP 5167121 B1 (page 12, FIG. 2)

SUMMARY OF INVENTION

Technical Problem

However, in Patent Citation 1, the adapter 170 and the third valve section 154 are members that repeatedly contact and separate from each other, and the auxiliary communicating passage 190 is formed in an annular side wall portion of the adapter 170, so that the degree of freedom in diameter in forming the auxiliary communicating passage 190 is low, and the formation of the auxiliary communicating passage 190 impairs the strength of the adapter 170.

The present invention has been made with attention focused on this problem, and has an object of providing a displacement control valve capable of quickly reducing pressure in a control chamber to a level of pressure kept during continuous driving at the time of the startup of a variable displacement compressor while retaining high strength.

Solution to Problem

In order to solve the foregoing problem, in a displacement control valve according to a first aspect of the present invention that includes: a valve housing including a first valve chest formed midway along a discharge-side passage that connects a discharge chamber for discharging fluid and a control chamber for controlling a fluid discharge rate, a second valve chest formed midway along a suction-side passage that connects a suction chamber for sucking fluid and the control chamber, and a pressure chamber formed across the first valve chest from the second valve chest; a valve body having a first valve section for opening and closing the discharge-side passage in the first valve chest, and a second valve section for opening and closing the suction-side passage in the second valve chest, the first valve section and the second valve section being integrally formed and performing opening and closing operations in opposite directions by reciprocation thereof; and a solenoid for exerting electromagnetic drive force on the valve body in such a direction as to close the first valve section, the displacement control valve is characterized in that the valve housing is provided with at least a part of a first communicating passage that communicates with the pressure chamber at one end thereof and that is communicable with the second valve chest at the other end thereof.

According to the first aspect, since in general the valve housing is a rigid body, the degree of freedom in forming at least the part of the first communicating passage is high, and even when at least the part of the first communicating passage is formed in the valve housing, the valve housing can retain high strength. At the time of the startup of the variable displacement compressor, the first communicating passage allows fluid in the control chamber under pressure higher than a level of pressure kept during continuous driving to flow into the second valve chest through the first communicating passage to be discharged into the suction chamber. Therefore, the pressure in the control chamber can be reduced to the level of pressure kept during continuous driving quickly while high strength is retained.

The displacement control valve according to a second aspect of the present invention is characterized in that the first communicating passage has a hole extending in an axial direction of the valve housing.

According to the second aspect, the valve housing, which is a rigid body in general, can be held at a state of high structural strength even with the hole that is formed therein to extend axially.

The displacement control valve according to a third aspect of the present invention is characterized in that the valve body has a hollow constituting a second communicating passage that axially connects the second valve chest and the pressure chamber, the pressure chamber has a pressure-sensitive element and an adapter housed therein, the pressure-sensitive element exerting an urging force in such a direction as to open the first valve section by extension thereof and contracts with an increase in ambient pressure, the adapter being provided at a free end of the pressure-sensitive element in an extending and contracting direction and having an annular seat surface. The valve element includes a third valve section that moves in the pressure chamber in an integrated manner and includes the second communicating passage, and the third valve section has an annular engaging surface for opening and closing the suction-side passage by being seated on and disengaged from the seat surface of the adapter.

According to the third aspect, by the contraction of the pressure-sensitive element with an increase in pressure in the pressure chamber, the second communicating passage communicates with the pressure chamber. Consequently, the fluid is allowed to flow into the second valve chest through the second communicating passage without interfering with a flow in the first communicating passage, and fine pressure adjustment can be performed.

The displacement control valve according to a fourth aspect of the present invention is characterized in that the solenoid includes a coil for generating a magnetic field by energization and a fixed core that has an end portion capable of abutting one end of the valve housing, and the fixed core includes, at the end portion thereof, a seat surface on which the second valve section is seated and a through hole that is formed radially therethrough and constitutes a part of the first communicating passage.

According to the fourth aspect, since the fixed core is a rigid body in general, it has high structural strength even with the through hole constituting a part of the first communicating passage extending radially, and thus allows the second valve section to be seated with stability.

DESCRIPTION OF EMBODIMENTS

A mode for carrying out a displacement control valve according to the present invention will be described below based on an embodiment.

Embodiment

The embodiment of the displacement control valve according to the embodiment will be described with reference to FIGS. 1 to 5. Hereinafter, the description is given with the right and left sides as viewed from the front side in FIG. 2 as the right and left sides of the displacement control valve.

Figure 1:
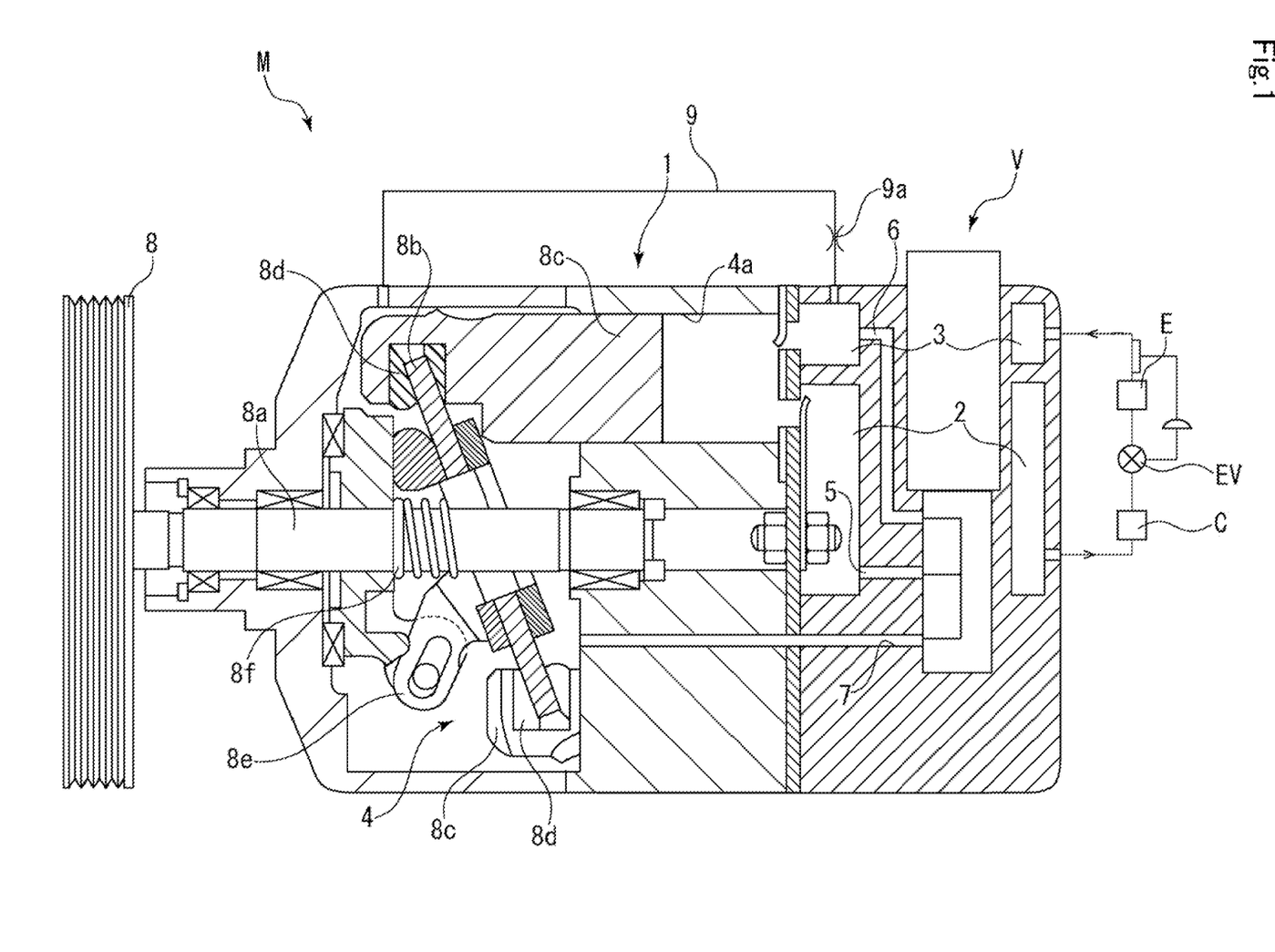
FIG. 1 is a schematic configuration diagram showing a swash plate variable displacement compressor with a displacement control valve according to the present invention.

As shown in FIG. 1, a variable displacement compressor M has a casing 1 that includes a discharge chamber 2, a suction chamber 3, a control chamber 4, and a plurality of cylinders 4a, and defines a communicating passage 5 as a discharge-side passage that connects the discharge chamber 2 and the control chamber 4, a communicating passage 6 as a suction-side passage that connects the suction chamber 3 and the control chamber 4, and a communicating passage 7 that serves both as a discharge-side passage and as a suction-side passage. A displacement control valve V according to the present invention is incorporated in the casing 1.

In the variable displacement compressor M, the discharge chamber 2 and the suction chamber 3 is connected to an external refrigeration and cooling circuit not shown. Note that the refrigeration and cooling circuit mentioned herein is provided with a condenser C, an expansion valve EV, and an evaporator E arranged in sequence, and constitutes the principal part of an air-conditioning system.

The variable displacement compressor M is also provided with a communicating passage 9 that directly connects the control chamber 4 and the suction chamber 3. The communicating passage 9 is provided with a fixed orifice 9a for adjusting the balance between pressure in the suction chamber 3 and pressure in the control chamber 4.

The variable displacement compressor M also includes a driven pulley 8 connected to a V belt (not shown) on the outside of the casing 1, a rotatable rotating shaft 8a protruded from the interior of the control chamber 4 to the outside of the casing 1 and fixed to the driven pulley 8, a swash plate 8b connected to the rotating shaft 8a in an eccentric state by a hinge mechanism 8e, a plurality of pistons 8c fitted reciprocably in the respective cylinders 4a, a plurality of connecting members 8d connecting the swash plate 8b and the respective pistons 8c, and a spring 8f fitted on the rotating shaft 8a.

The swash plate 8b is variable in inclination angle according to a control pressure Pc. This is because while the spring 8f and the hinge mechanism 8e exert a force on the swash plate 8b at all times, the stroke width of the plurality of pistons 8c changes according to the control pressure Pc, and therefore the inclination angle of the swash plate 8b is limited by the stroke width of the plurality of pistons 8c. Thus, the higher the control pressure Pc, the smaller the inclination angle of the swash plate 8b. Under pressure above a certain level, the hinge mechanism 8e imposes a limit, and the swash plate 8b is almost perpendicular with respect to the rotating shaft 8a (i.e. an axis of the swashplate 8b is slightly inclined from that of the rotating shaft 8). Furthermore, the lower the control pressure Pc, the larger the inclination angle of the swash plate 8b. Under pressure below a certain level, the hinge mechanism 8e imposes a limit, and the angle at that time is a maximum inclination angle.

When the swash plate 8b is almost perpendicular to the rotating shaft 8a, the pistons 8c have a minimum amount of stroke, the cylinders 4a and the pistons 8c apply minimum pressure to fluid, and the air-conditioning system has a minimum cooling capacity. When the swash plate 8b is at a maximum inclination angle, the pistons 8c have a maximum amount of stroke, the cylinders 4a and the pistons 8c apply maximum pressure to fluid, and the air-conditioning system has a maximum cooling capacity.

The variable displacement compressor M adjusts the discharge rate by adjusting the electromagnetic force of the displacement control valve V under duty control, for example, and thereby adjusting the control pressure Pc in the control chamber 4. Specifically, by adjusting current passed through a coil 87 of the displacement control valve V, the degrees of opening of a first valve section 52 and a second valve section 53 are adjusted as described later. This means that the fluid flowing into the control chamber 4 or flowing out from the control chamber 4 is controlled, and as a result the control pressure Pc is adjusted. By this adjustment, the variable displacement compressor M changes the amount of stroke of the plurality of pistons 8c.

Figure 2:
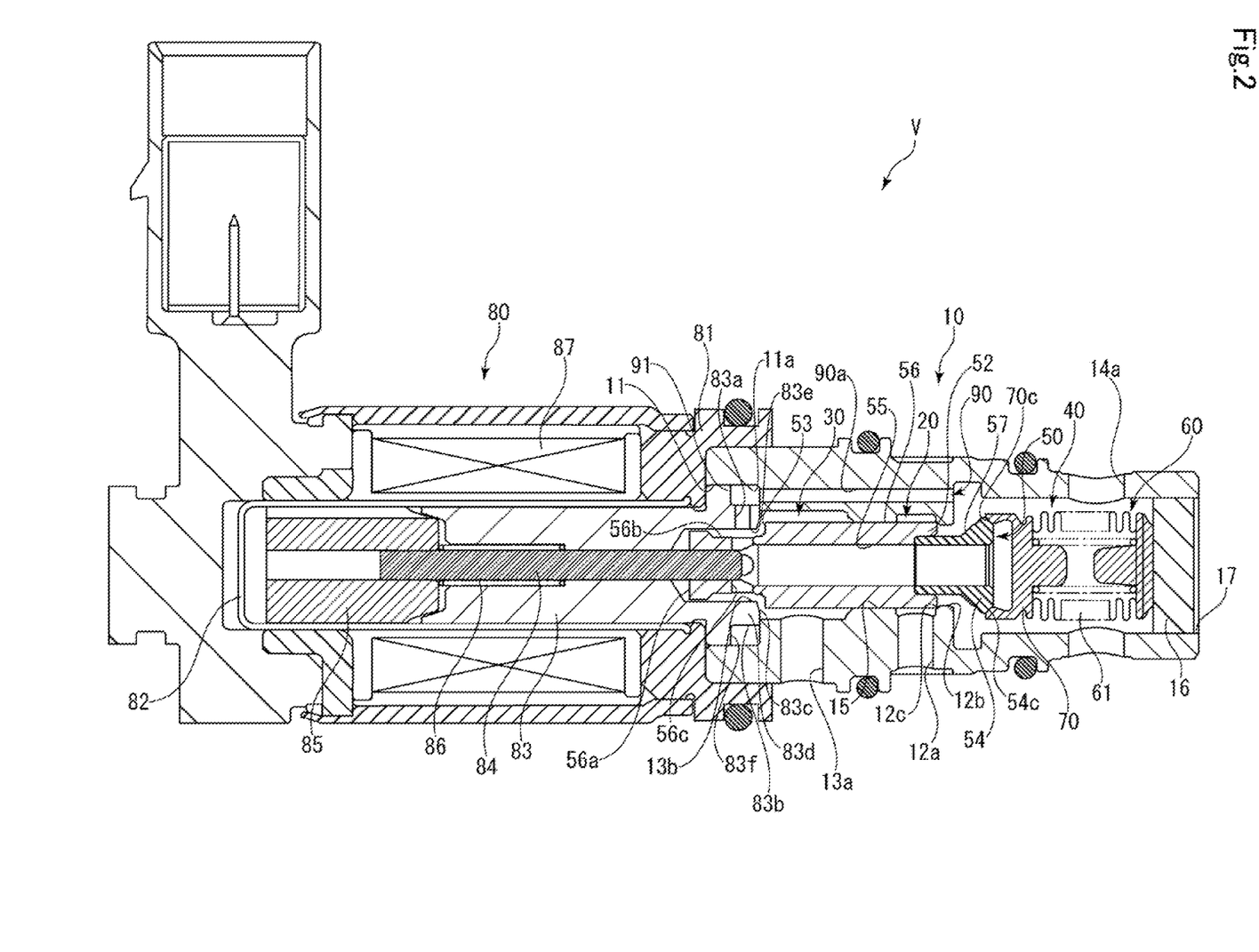
FIG. 2 is a cross-sectional view showing the entirety of an embodiment of the displacement control valve according to the present invention in which a coil is energized and a second valve section is opened.

As shown in FIG. 2, the displacement control valve V includes a valve housing 10 formed of a metal material or a resin material, a valve body 50 disposed reciprocably in the valve housing 10, a pressure-sensitive element 60 for urging the valve body 50 in a direction (i.e. in the left direction), and a solenoid 80 connected to the valve housing 10 for exerting electromagnetic drive force on the valve body 50.

For the sake of explanatory convenience, the cross-sectional views of the displacement control valve V shown in FIGS. 2 to 5 are shown by cross sections cut by two planes orthogonal to each other along an axis.

The solenoid 80 includes a casing 81 connected to the valve housing 10, a sleeve 82 closed at one end, a cylindrical fixed core 83 disposed inside the casing 81 and the sleeve 82, a drive rod 84 connected at its distal end to the valve body 50 and freely reciprocating inside the fixed core 83, a movable core 85 fixed to the other end of the drive rod 84, a coil spring 86 urging the movable core 85 in such a direction as to open the first valve section 52, and an exciting coil 87 wound around the outside of the sleeve 82 via a bobbin.

The fixed core 83 is formed from a rigid body of a magnetic material such as iron or silicon steel. At one end of the fixed core 83, an annular flange 83d extending radially outward is formed. The flange 83d extends into an opening 11 of the valve housing 10 described later. The flange 83d has a large-diameter surface 83g fixed in close contact with an inner peripheral surface 11a of the opening 11. In the flange 83d, a recess 83e hollowed toward the movable core 85 is formed. On one axial end side and the radially outside of the flange 83d, a small-diameter surface 83b that is formed substantially parallel to the axial direction and is smaller in diameter than the large-diameter surface 83g, and a vertical surface 83f extending from the small-diameter surface 83b substantially perpendicularly in the radially outward direction at the side of the movable core 85 of the small-diameter surface 83b are formed. The radially outer side of the vertical surface 83f is continuous with the large-diameter surface 83g. Further, in the flange 83d, a through hole 83a extending radially therethrough extends from the small-diameter surface 83b to the recess 83e.

The valve housing 10 is formed in a substantially cylindrical shape, and is formed at one end with the opening 11 of a recessed shape in a cross-sectional view in which the solenoid 80 is fixedly fitted, at the other end with an opening 17 into which a partition adjustment member 16 described later is press-fitted, and at its inner periphery with a small-diameter guide surface 15 described later with which the valve body 50 is slidably brought into contact.

The partition adjustment member 16 constitutes a part of the valve housing 10 and defines a third valve chest 40 described later. By adjusting the position in which the partition adjustment member 16 is press-fitted in the opening 17, the sensitivity of the pressure-sensitive element 60 described later can be adjusted.

The valve housing 10 also includes communicating passages 12a, 12b, and 14a functioning as a discharge-side passage, communicating passages 13a, 13b, and 14a functioning as a suction-side passage together with a first communicating passage 90 and a second communicating passage 55 of the valve body 50 described later, a first valve chest 20 formed midway along the discharge-side passage, a second valve chest 30 formed midway along the suction-side passage, and the third valve chest 40 (corresponding to a pressure chamber) formed across the first valve chest 20 from the second valve chest 30. That is, the communicating passages 14a and the third valve chest 40 are formed to also serve as a part of the discharge-side passage and the suction-side passage. Specifically, the communicating passage 13b is formed with the valve housing 10 and the flange 83d and the recess 83e of the fixed core 83.

The first communicating passage 90 that connects the second valve chest 30 and the third valve chest 40 is formed in the valve housing 10. The first communicating passage 90 consists of a through hole 90a axially extending through the valve housing 10, the through hole 83a radially extending through the fixed core 83, and a connecting space 91 formed by fixedly fitting the fixed core 83 in the valve housing 10.

The communicating passages 12a and 13a are equiangularly arranged in the circumferential direction of the valve housing 10. The through hole 90a is formed in a position displaced 90 degrees in the circumferential direction of the valve housing 10 with respect to the communicating passages 12a and 13a, to form the valve housing 10 in a small shape. Note that the through hole 90a may be formed in any position where it does not interfere with the communicating passages 12a and 13a, instead of being formed in a position displaced 90 degrees in the circumferential direction of the valve housing 10 with respect to the communicating passages 12a and 13a. Alternatively, a plurality of through holes 90a may be formed in such positions.

The connecting space 91 is an annular space formed by fixedly fitting the flange 83d of the fixed core 83 in the opening 11 formed in a recessed shape in a cross-sectional view of the valve housing 10, and specifically, is defined and formed by the inner peripheral surface 11a of the opening 11 and the small-diameter surface 83b and the vertical surface 83f of the flange 83d.

The through holes 90a and 83a each communicate with the connecting space 91. Since the connecting space 91 is annular, by positioning and fixing the fixed core 83 in the valve housing 10, the through hole 90a can be connected to the connecting space 91, and as a result the first communicating passage 90 is formed.

The valve body 50 is formed of a primary valve element 56 and a secondary valve element 57, and includes the first valve section 52 provided on one end side of the primary valve element 56, the second valve section 53 provided on the other end side of the primary valve element 56, and a third valve section 54 provided at the secondary valve element 57 that is fitted later to be connected to the primary valve element 56 across the first valve section 52 from the second valve section 53. The secondary valve element 57, which is connected to the primary valve element 56, thus moves with the primary valve element 56 in an integrated manner.

The valve body 50 is formed in a substantially cylindrical shape including the second communicating passage 55 that extends therethrough from the second valve section 53 to the third valve section 54 in its axial direction and functions as the suction-side passage. Note that a valve section engages a seat surface (corresponding to a valve seat) to constitute a valve.

The valve body 50 can close the discharge-side passage by the first valve section 52 being seated on a first seat surface 12c formed at an end portion of the communicating passage 12b in the first valve chest 20, and close the suction-side passage by the second valve section 53 in the second valve chest 30 being seated on a second seat surface 83c formed at an end portion of the fixed core 83.

The primary valve element 56 has, in a direction from the second valve section 53 to the solenoid 80, a neck 56b that is formed smaller in diameter than the second valve section 53 and extends into the recess 83e, and a head 56a that is located closer to the solenoid 80 than the neck 56b and is larger in diameter than the neck 56b. The head 56a extends into the recess 83e of the fixed core 83. The drive rod 84 is fixed to the head 56a in a coaxial relationship to the head 56a.

The primary valve element 56 reciprocates, guided by the guide surface 15 of the valve housing 10, and thus can perform precise movement repeatedly.

In the neck 56b of the primary valve element 56, four through holes 56c are equiangularly arranged in the circumferential direction and extend radially. The through holes 56c, the second valve chest 30, and the second communicating passage 55 communicate with each other.

The secondary valve element 57 is formed in a substantially cylindrical shape, and includes the third valve section 54 formed spread toward the pressure-sensitive element 60. The third valve section 54 extends through the communicating passage 12b, and includes at its outer peripheral edge an annular engaging surface 54c opposite an adapter 70 described later.

The pressure-sensitive element 60 includes a bellows 61 and the adapter 70. The bellows 61 is fixed at its one end to the partition adjustment member 16, and at the other end (i.e. a free end) holds the adapter 70. The adapter 70 is formed in roughly a U-shape in a cross-sectional view, including at its distal end an annular third seat surface 70c that is opposite the engaging surface 54c of the third valve section 54 to be seated on and disengaged from the engaging surface 54c.

The pressure-sensitive element 60 is disposed in the third valve chest 40, and operates to urge the first valve section 52 in an opening direction by its extension (or expansion), and to separate the third seat surface 70c of the adapter 70 from the engaging surface 54c of the third valve section 54 by contracting with an increase in pressure in the third valve chest 40.

The configuration of the displacement control valve V has been described above. Hereafter, with reference to FIGS. 1 to 4, a mode when the displacement control valve V is switched from a state of being energized (hereinafter, sometimes referred to as "an energized state") to a state of being non-energized (hereinafter, sometimes referred to as "a non-energized state"), and further the non-energized state is continued will be described in detail.

Figure 3:
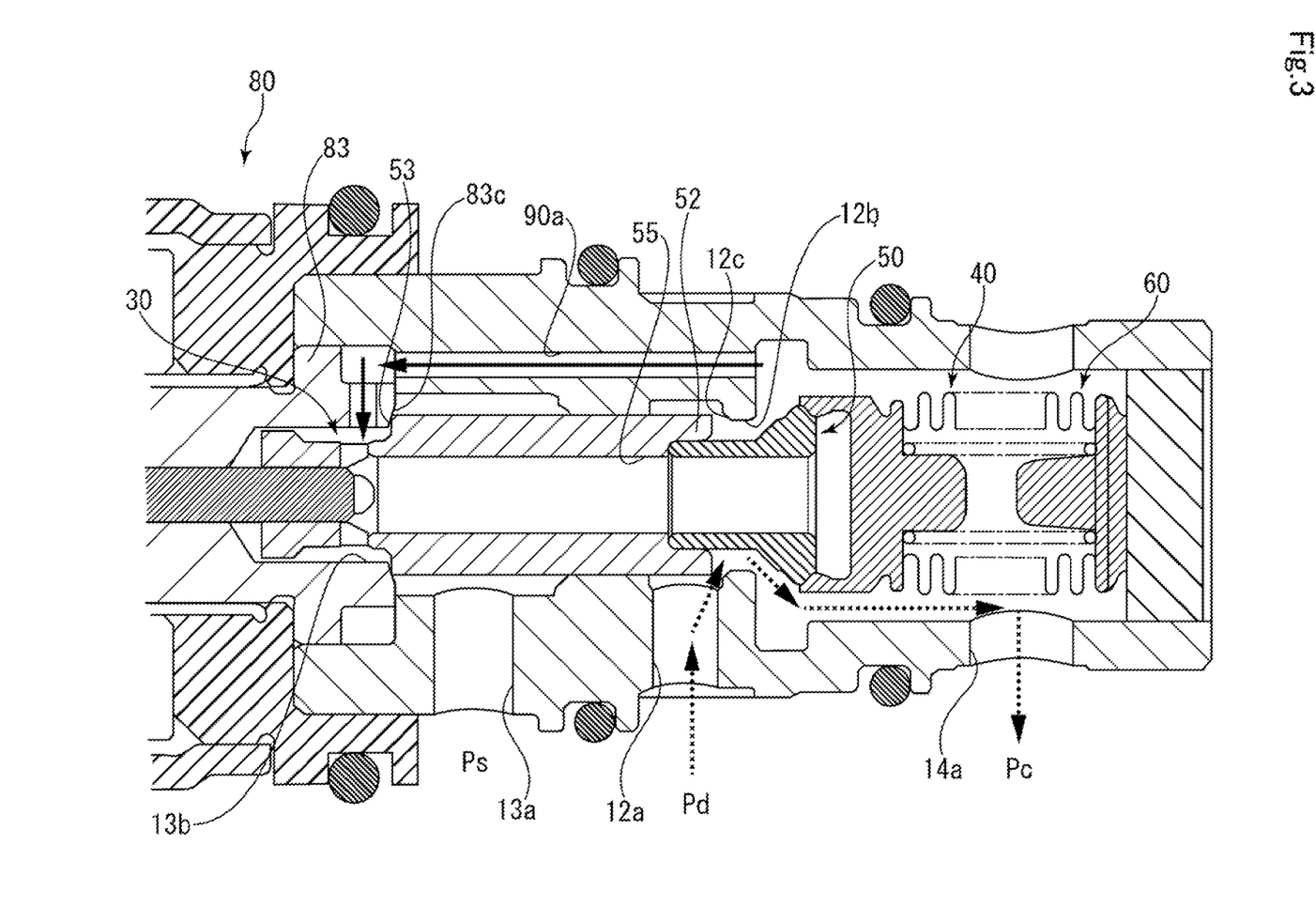
FIG. 3 is an enlarged view of valve sections of the displacement control valve in which the coil is not energized and a first valve section is opened.

As shown in FIG. 3, when the displacement control valve V is not energized, the valve body 50 is pressed toward the solenoid 80 by the pressure-sensitive element 60, so that the second valve section 53 is seated on the second seat surface 83c of the fixed core 83, thereby closing the communicating passages 13a and 13b as the suction-side passage. On the other hand, the first valve section 52 is separated from the first seat surface 12c formed at the end portion of the communicating passage 12b, opening the communicating passages 12a, 12b, and 14a as the discharge-side passage (shown by dotted-line arrows in FIG. 3).

When the coil 87 of the solenoid 80 that has been energized becomes non-energized, the communicating passages 12a, 12b, and 14a as the discharge-side passage are opened by the displacement control valve V, so that fluid in the discharge chamber 2 flows from the discharge chamber 2 through the displacement control valve V into the control chamber 4. This occurs because the discharge pressure Pd is pressure higher than the control pressure Pc, and the discharge pressure Pd is in equilibrium with the control pressure Pc.

The inflow of the discharge pressure Pd into the control chamber 4 causes the control pressure Pc to become pressure higher than the control pressure Pc before the non-energized state, and thus to become pressure higher than the suction pressure Ps, which is expressed by the relational expression Ps<Pc≤Pd. Consequently, fluid in the control chamber 4 flows into the suction chamber 3 through the communicating passage 9 and the fixed orifice 9a. The inflows of the fluid are performed until the discharge pressure Pd, the suction pressure Ps, and the control pressure Pc reach equilibrium. Thus, when the displacement control valve V is left standing for a long time, the discharge pressure Pd, the suction pressure Ps, and the control pressure Pc are equilibrated to be equal pressure (Ps=Pc=Pd), and the suction pressure Ps and the control pressure Pc become much higher than pressure during continuous driving.

In the displacement control valve V left standing for a long time, while the second valve chest 30 is cut off by the second valve section 53 and the second seat surface 83c, on the side of the solenoid 80 of the cut-off second valve chest 30, the second valve chest 30 and the third valve chest 40 are communicated by the first communicating passage 90, and the interior of the side of the communicating passage 13a of the cut-off second valve chest 30 is communicated to the suction chamber 3. Thus, the pressure in the second valve chest 30 is also equilibrated with the discharge pressure Pd, the suction pressure Ps, and the control pressure Pc, to be equal pressure. Likewise, the second communicating passage 55, which is connected to the side of the solenoid 80 of the second valve chest 30, is equalized in pressure. Therefore, the interior of the displacement control valve V is equilibrated with the discharge pressure Pd, the suction pressure Ps, and the control pressure Pc, to be equal pressure. Note that the fluid is refrigerant fluid such as carbon dioxide, and is gaseous in the control chamber 4 during normal operation. However, by being left standing for a long time, the fluid may be liquefied.

Next, a mode until the fluid is discharged from the control chamber 4 when the variable displacement compressor M is started will be described in detail with reference to FIGS. 1 to 5.

When the variable displacement compressor M is started with the discharge pressure Pd, the suction pressure Ps, and the control pressure Pc being equal, the control pressure Pc at this time has pressure much higher than the control pressure Pc during continuous driving, and thus the pistons 8c have a minimum stroke, and the swash plate 8b is almost perpendicular to the rotating shaft 8a. The variable displacement compressor M starts to energize the displacement control valve V in response to its own startup.

By the coil 87 of the solenoid 80 being energized, the displacement control valve V, when in the non-energized state shown in FIG. 3, is excited, generating magnetic force. When this magnetic force exceeds the pressing forces of the pressure-sensitive element 60 and the coil spring 86 of the solenoid 80, as shown in FIGS. 2 and 4, the movable core 85 is attracted to the fixed core 83 subjected to the magnetic force, the drive rod 84 connected at one end to the movable core 85 is driven, and the valve body 50 connected to the other end of the drive rod 84 moves toward the pressure-sensitive element 60.

Figure 4:
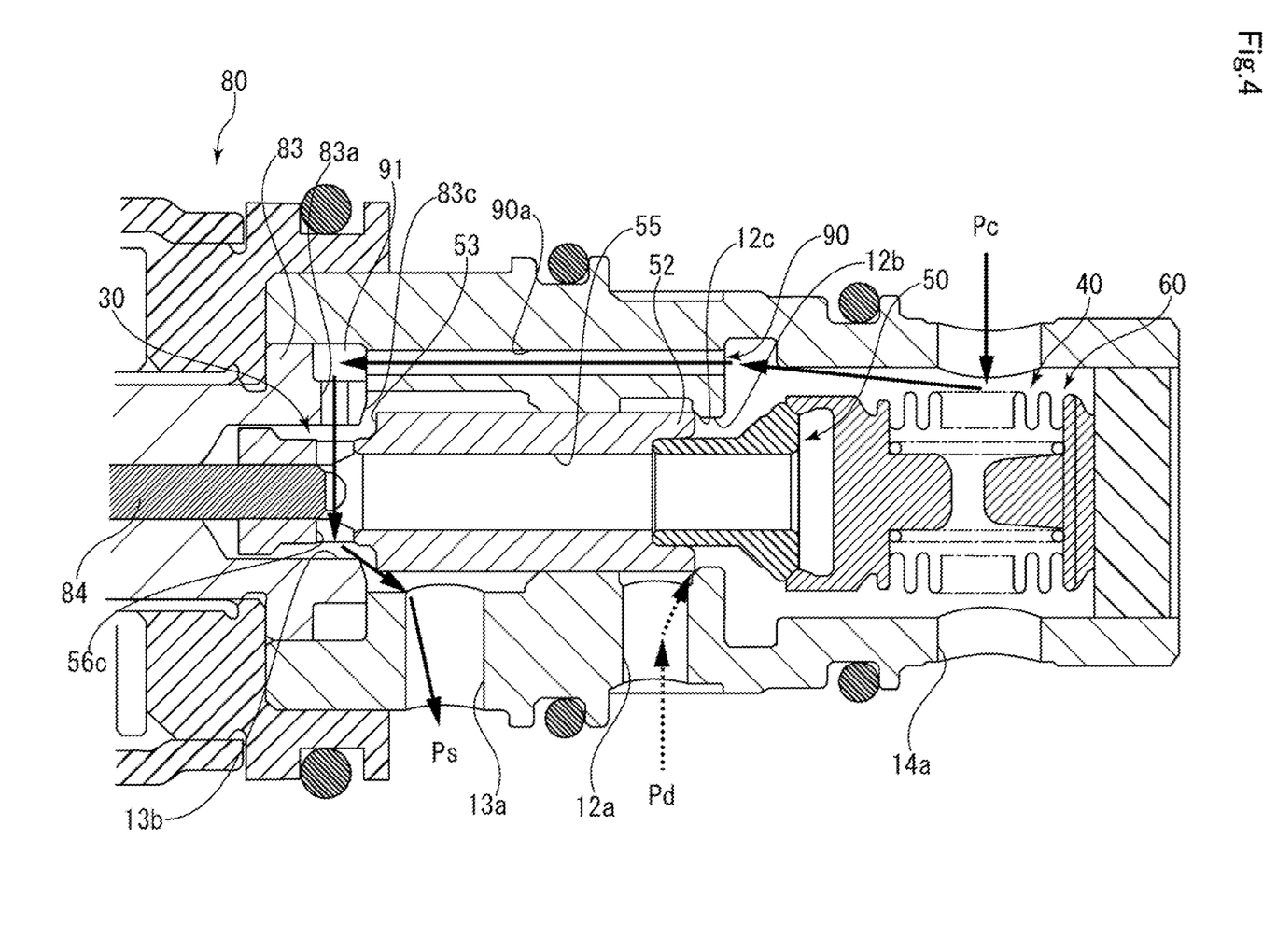
FIG. 4 is an enlarged view of the valve sections of the displacement control valve in which the coil is energized and the second valve section is opened.

Consequently, in the displacement control valve V, as shown in FIG. 4, the first valve section 52 is seated on the first seat surface 12c formed at the end portion of the communicating passage 12b, closing the communicating passages 12a, 12b, and 14a as the discharge-side passage. On the other hand, the valve body 50 slides toward the pressure-sensitive element 60, causing the second valve section 53 to separate from the second seat surface 83c of the fixed core 83, opening the communicating passages 13a and 13b as the suction-side passage.

Figure 5:
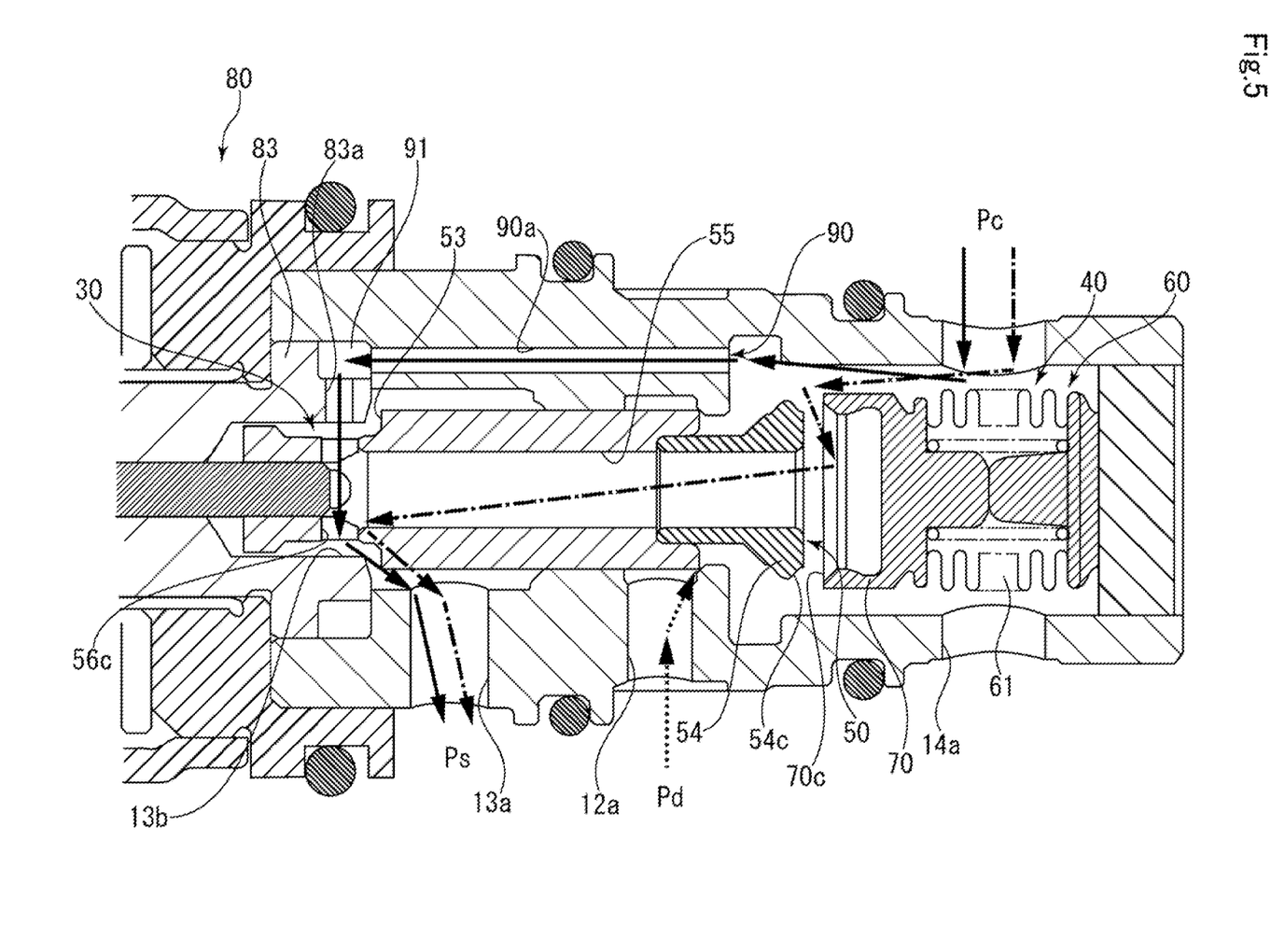
FIG. 5 is an enlarged view of the valve sections of the displacement control valve in which the coil is energized and the second valve section and a third valve section are opened.

In the displacement control valve V, the opening of the communicating passages 13a and 13b as the suction-side passage results in the formation of a flow path from the control chamber 4 to the communicating passages 14a, the third valve chest 40, the first communicating passage 90 (constituted by the through hole 90a, the connecting space 91, and the through hole 83a), the second valve chest 30 and the through holes 56c, the communicating passage 13b, and the communicating passages 13a in this order (shown by solid-line arrows in FIGS. 4 and 5).

Immediately after the startup, the suction pressure Ps is lower than the suction pressure that has been equalized because the fluid is compressed by the pistons 8c in the cylinders 4a, and the compressed fluid flows into the discharge chamber 2. On the other hand, in the discharge chamber 2, the discharge pressure Pd increases by the inflow of the fluid.

Thus, a pressure difference occurs between the discharge pressure Pd, the suction pressure Ps, and the control pressure Pc that have been equal before the startup of the variable displacement compressor M. In summary, immediately after the startup of the variable displacement compressor M, the relational expression is Ps<Pc≤Pd. Consequently, the fluid in the control chamber 4 starts to flow into the suction chamber 3 via the displacement control valve V.

As shown in FIG. 4, the fluid in the control chamber 4 flows in from the communicating passages 14a of the displacement control valve V, flows from the third valve chest 40 through the first communicating passage 90 into the second valve chest 30, passes through the communicating passages 13b and 13a in this order, and flows into the suction chamber 3.

Fluid in the control chamber 4 may be liquefied by being left standing for a long time. When left standing for a long time, the discharge pressure Pd, the suction pressure Ps, and the control pressure Pc are equilibrated to be equal pressure (Ps=Pc=Pd) as described above. Thus, as shown in FIG. 5, when an increase in pressure in the third valve chest 40 causes the bellows 61 to contract, separating the third seat surface 70c of the adapter 70 from the engaging surface 54c of the third valve section 54, the second communicating passage 55 communicates the second valve chest 30 to the third valve chest 40. When the variable displacement compressor M is started in this state, the liquefied fluid can be discharged through the second communicating passage 55. When the pressure in the third valve chest 40 while the displacement control valve V is left standing is low, the third seat surface 70c is not separated from the engaging surface 54c. However, even when the third valve section 54 is closed after the startup of the variable displacement compressor M, the first communicating passage 90 is in a communicating state, so that the displacement control valve V can discharge the liquefied fluid.

In the displacement control valve V, the opening of the second communicating passage 55 results in the formation of a flow path from the control chamber 4 to the communicating passages 14a, the third valve chest 40 and the second communicating passage 55, the second valve chest 30 and the through holes 56c, the communicating passage 13b, and the communicating passages 13a in this order (shown by dash-dot-line arrows in FIG. 5). Thus, two passages, the first communicating passage 90 and the second communicating passage 55, constitute the suction-side passage connecting the second valve chest 30 and the third valve chest 40, increasing the cross-sectional area of the suction-side passage. That is, fluid in the control chamber 4 moves into the suction chamber 3 more easily than when only the first communicating passage 90 constitutes the suction-side passage. Therefore, since the discharge of fluid in the control chamber 4 is facilitated, the control pressure Pc is decreased quickly, and the fluid moves until the control pressure Pc is brought into equilibrium with the suction pressure Ps.

In the displacement control valve V, the decrease of the control pressure Pc causes the pressure in the third valve chest 40 to also decrease. For the adapter 70, when the pressure in the third valve chest 40 falls below the urging force of the bellows 61, the bellows 61 presses the adapter 70 to the third valve section 54, and as shown in FIG. 4, the third seat surface 70c of the adapter 70 is seated on the engaging surface 54c of the third valve section 54, thereby closing communication between the second communicating passage 55 and the third valve chest 40.

As described above, since the valve housing 10 is a rigid body, the displacement control valve V in the present embodiment has a high degree of freedom in forming at least a part of the first communicating passage 90. Even when at least a part of the first communicating passage 90 is formed in the valve housing 10, the valve housing 10 can retain high strength. Since the first communicating passage 90 connected at its one end to the third valve chest 40 and at its other end facing the second valve chest 30 is provided, at the time of the startup of the variable displacement compressor M, fluid in the control chamber 4 under pressure higher than pressure during continuous driving flows into the second valve chest 30 through the first communicating passage 90, and is discharged to the suction chamber 3. Therefore, the displacement control valve V can reduce pressure in the control chamber 4 to pressure during continuous driving quickly while retaining high strength.

The first communicating passage 90, which is formed not in the adapter 70 and/or the secondary valve element 57 but in the valve housing 10 and the fixed core 83, thus has a high degree of freedom in diameter when formed, and has high structural strength. The valve housing 10 and the fixed core 83 are fixed members and do not move, and have high structural strength, and thus are less susceptible to damage.

On the other hand, when a through hole is provided in the adapter 70 and/or the secondary valve element 57 as in Patent Citation 1, the displacement control valve V may be damaged because the adapter 70 and the secondary valve element 57 constitute a valve and contact and separate from each other, and a through hole of a large diameter cannot be provided.

In Patent Citation 1, when the control pressure Pc causes the pressure-sensitive element 160 to contract, enlarging the flow path into the intermediate communicating passage 155, fluid in the control chamber flows into the intermediate communicating passage 155 from two places in close proximity to each other, a space between the third valve section 154 and the adapter 170 separated from each other and the auxiliary communicating passage 190. Then, the flows join together in the intermediate communicating passage 155. The two flows are different in direction, and thus cause energy loss when joining together, preventing quick reduction of the control pressure Pc. In contrast, in the present embodiment, both the first communicating passage 90 and the second communicating passage 55 are independent flow paths, and thus do not interfere with each other when both are in an opened state. That is, flows through the first communicating passage 90 and the second communicating passage 55 do not join together in the first communicating passage 90 or in the second communicating passage 55, thus causing no energy loss. Therefore, the control pressure Pc can be reduced quickly, and the fluid is allowed to flow into the second valve chest 30 quickly.

The first communicating passage 90 is not only formed in the valve housing 10 but also partly extends radially in the end portion of the fixed core 83 that closes one end of the valve housing 10. The fixed core 83 is formed from a rigid body of a magnetic material such as iron or silicon steel. Therefore, the fixed core 83 has high structural strength even with the first communicating passage 90 formed radially, and thus allows the second valve section 53 to be seated with stability.

Even when the displacement control valve V is not energized, the first communicating passage 90 communicates with the second valve chest 30, and the second communicating passage 55 communicates with the second valve chest 30, so that the pressure in the second communicating passage 55 rises according to a rise in the control pressure Pc. This results in a condition where the pressure-sensitive element 60 contracts easily because pressure in a direction of contracting the pressure-sensitive element 60 from the second communicating passage 55 to the adapter 70 is increased.

Although the embodiment of the present invention has been described above with reference to the drawings, a specific configuration thereof is not limited to the embodiment. Any changes and additions made without departing from the scope of the present invention are included in the present invention.

The second seat surface 83c on which the second valve section 53 is seated has been described as a mode of being formed at the end portion of the fixed core 83 that closes the one end of the valve housing 10, but is not limited to this, and may be formed at a component different from the valve housing 10 and the fixed core 83.

A part of the first communicating passage 90 has been described as a mode of being formed in the end portion of the fixed core 83 that closes the one end of the valve housing 10, but is not limited to this. The first communicating passage 90 may be formed only in the valve housing 10, and may be made as a mode where an axial hole and a radial hole communicating with the axial hole are provided in the valve housing 10, for example. Alternatively, the first communicating passage 90 may be formed in a component different from the valve housing 10 and the fixed core 83.

The first communicating passage 90 has been described as a mode of having the one through hole 90a and the one through hole 83a both communicating with the connecting space 91, but is not limited to this. In the first communicating passage 90, a plurality of through holes 90a and a plurality of through holes 83a may be formed as the structural strength of the valve housing 10 or the fixed core 83 permits. The respective numbers of the through holes 90a and 83a formed may be different. Their respective diameters may be different. The through holes may be of a shape other than a substantially circular shape in a cross-sectional view.

The two communicating passages 12a and the two communicating passages 13a have been described as a mode of being equiangularly arranged in the valve housing 10, but are not limited to this. Only one communicating passage 12a and only one communicating passage 13a may be formed on the same side in the valve housing 10. Alternatively, a plurality of communicating passages 12a and a plurality of communicating passages 13a may be formed in the circumferential direction of the valve housing 10 as the structural strength permits.

The valve body 50 has been described as a mode of including the second communicating passage 55, but is not limited to this, and may be solid.

REFERENCE SIGNS LIST 2 discharge chamber
3 suction chamber
4 control chamber
10 valve housing
12a, 12b communicating passage (discharge-side passage)
12c first seat surface
13a, 13b communicating passage (suction-side passage)
14a communicating passage (discharge-side passage and suction-side passage)
20 first valve chest
30 second valve chest
40 third valve chest (pressure chamber)
50 valve body
52 first valve section
53 second valve section
54 third valve section
54c engaging surface
55 second communicating passage
60 pressure-sensitive element
70 adapter
70c third seat surface (seat surface)
80 solenoid
83 fixed core
83a through hole (first communicating passage)
83c second seat surface (seat surface)
87 coil
90 first communicating passage
90a through hole (first communicating passage)
91 connecting space (first communicating passage)
Pc control pressure
Pd discharge pressure
Ps suction pressure
V displacement control valve

The invention claimed is:

1. A displacement control valve comprising:
a valve housing comprising a first valve chest formed on a discharge-side passage that is formed inside the valve housing and communicates outside the valve housing so as to connect a discharge chamber for discharging fluid and a control chamber for controlling a fluid discharge rate, a second valve chest formed on a suction-side passage that is formed inside the valve housing and communicates outside the valve housing so as to connect a suction chamber for sucking fluid and the control chamber, and a pressure chamber formed across the first valve chest from the second valve chest;
a valve body having a first valve section for opening and closing the discharge-side passage in the first valve chest, and a second valve section for opening and closing the suction-side passage in the second valve chest, the first valve section and the second valve section being integrally formed and performing opening and closing operations in opposite directions by reciprocation thereof; and
a solenoid for exerting electromagnetic drive force on the valve body in such a direction as to close the first valve section, wherein
the valve housing is provided with at least a first part of a first communicating passage that communicates with the pressure chamber at one end thereof and that is communicable with the second valve chest at the other end thereof
the solenoid comprises a coil for generating a magnetic field by energization and a fixed core that has an end portion capable of abutting one end of the valve housing, and
the fixed core comprises, at the end portion thereof, a seat surface on which the second valve section is seated and a through hole that extends radially through the fixed core and constitutes a part of the first communicating passage.

2. The displacement control valve according to claim 1, wherein the first part of the first communicating passage is a hole extending in an axial direction of the valve housing.

3. The displacement control valve according to claim 1, wherein
the valve body has a hollow portion constituting a second communicating passage that axially connects the second valve chest and the pressure chamber,
the pressure chamber has a pressure-sensitive element and an adapter housed therein, the pressure-sensitive element exerting an urging force in such a direction as to open the first valve section by extension thereof and contracts with an increase in ambient pressure, the adapter being provided at a free end of the pressure-sensitive element in an extending and contracting direction and having an annular seat surface,
the valve body comprises a third valve section that moves in the pressure chamber in an integrated manner with the valve body and comprises the second communicating passage, and
the third valve section has an annular engaging surface for opening and closing the suction-side passage by being seated on and disengaged from the seat surface of the adapter.

4. The displacement control valve according to claim 2, wherein
the valve body has a hollow portion constituting a second communicating passage that axially connects the second valve chest and the pressure chamber,
the pressure chamber has a pressure-sensitive element and an adapter housed therein, the pressure-sensitive element exerting an urging force in such a direction as to open the first valve section by extension thereof and contracts with an increase in ambient pressure, the adapter being provided at a free end of the pressure-sensitive element in an extending and contracting direction and having an annular seat surface,
the valve body comprises a third valve section that moves in the pressure chamber in an integrated manner with the valve body and comprises the second communicating passage, and
the third valve section has an annular engaging surface for opening and closing the suction-side passage by being seated on and disengaged from the seat surface of the adapter.

* * * * *